No. 629,920. Patented Aug. 1, 1899.
E. PUTTKAMMER.
POTATO DIGGER.
(Application filed Oct. 27, 1898.)
(No Model.) 2 Sheets—Sheet 1.

Witnesses Inventor
Emil Puttkammer
by H. B. Willson & Co.
Attorneys

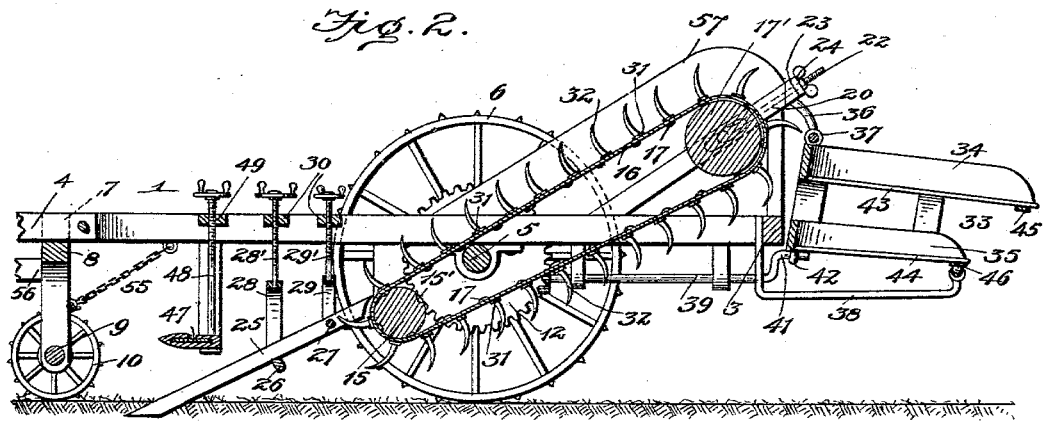

UNITED STATES PATENT OFFICE.

EMIL PUTTKAMMER, OF MACHIPONGO, VIRGINIA.

POTATO-DIGGER.

SPECIFICATION forming part of Letters Patent No. 629,920, dated August 1, 1899.

Application filed October 27, 1898. Serial No. 694,740. (No model.)

*To all whom it may concern:*

Be it known that I, EMIL PUTTKAMMER, a citizen of the United States, residing at Machipongo, in the county of Northampton and State of Virginia, have invented certain new and useful Improvements in Potato-Diggers; and I do declare the following to be a full, clear, and exact description of the invention, such as will enable others skilled in the art to which it appertains to make and use the same.

My invention relates to potato-diggers, and particularly to the class of endless-carrier potato-diggers, and has for its object to provide an improved machine of this character which will combine simplicity of construction, durability, economy, and efficiency in operation.

To these ends and advantages the invention will be hereinafter described and claimed, reference being had to the accompanying drawings, in which like characters of reference denote like parts.

Figure 1:
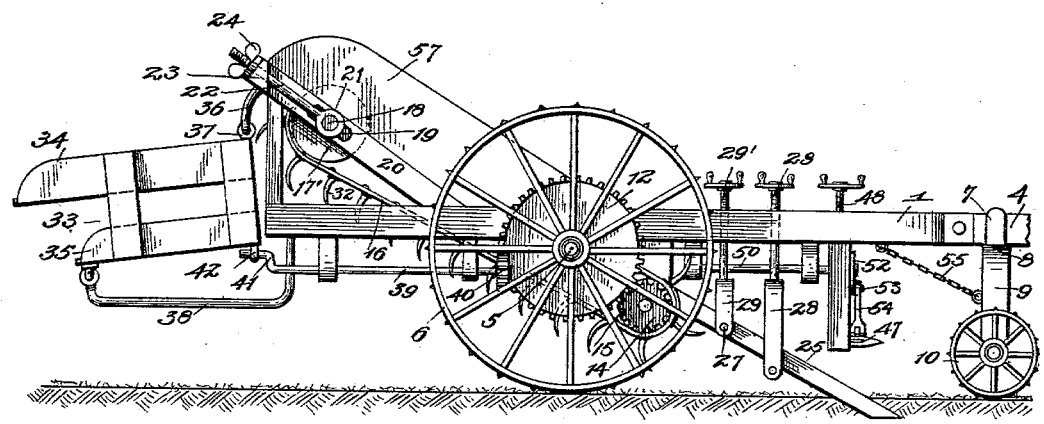
Figure 4:
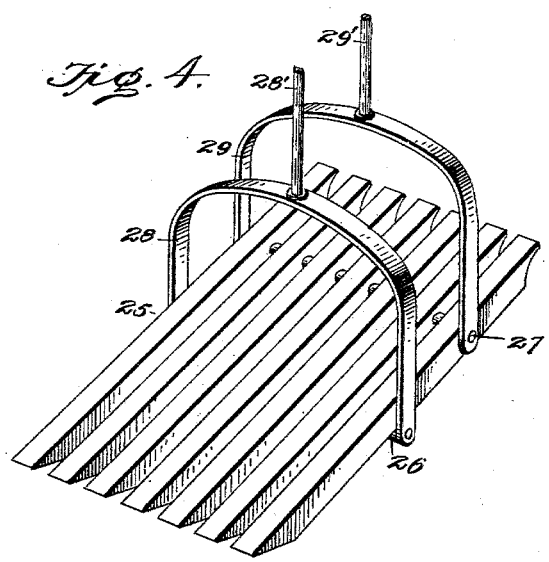
Figure 5:
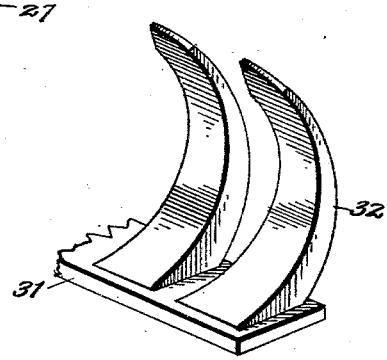

In the drawings, Figure 1 is a side elevation of my improved machine. Fig. 2 is a central vertical longitudinal section. Fig. 3 is a top plan view. Fig. 4 is a detail perspective view of the digger teeth or fork, and Fig. 5 is a fragmentary view of a portion of one of the toothed bars of the elevator-apron.

The machine is provided with a main supporting-frame consisting of the parallel side bars 1 and 2, connected together at their rear ends by a cross-bar 3 and converging at their forward ends and bolted to a single forwardly-extending bar 4. The said main frame is supported centrally by an axle 5, journaled in the ground-wheels 6 and 6', the forwardly-extending bar 4 resting loosely between the two upwardly-projecting ears or lugs 7, connected to the top of an arch-shaped bar or yoke 8, to the legs 9 of which are journaled the small ground-wheels 10, this construction comprising the front truck of the machine.

Rigidly connected to the main shaft or axle 5, between the main supporting-wheels and the parallel sides of the main frame, are two large gear-wheels 12 and 13, the teeth of which project beyond their outer vertical faces for a purpose which will hereinafter appear. Meshing with the gear-wheel 12 is a smaller gear-wheel 14, mounted on the end of the forward longitudinally-grooved drive-roller 15 of an elevator mechanism comprising the endless apron 16, to the inner side of which are attached at regular intervals transverse slats 17, being half-round in cross-section, the said slats engaging the longitudinal grooves 15' of the drive-roller 15, thus insuring a positive movement of the apron 16 and preventing any tendency of said apron to slip.

The upper and rear end of the elevator-apron 16 runs over and is supported by an idle-roller 17', the reduced ends 18 of which extend through elongated slots 19 in the oblique bars of an auxiliary frame 20, mounted upon the rear end of the main supporting-frame, and are journaled in eyes or rings 21 21, connected to the ends of screw-threaded rods 22 22, which extend through castings 23 23, rigidly connected to the upper ends of the auxiliary frame 20, and are provided with thumb-nuts 24 24, thus providing means for tightening or loosening the said endless carrier 16.

Between the front truck and the lower drive-roller 15 are supported the digger teeth or fork 25, which consists of a series of bars beveled at each end, fastened together midway of their length and on their lower sides by a cross-bar 26, also being provided midway between their central points and their upper ends with a transverse rod 27, which passes directly through each tine or tooth of the fork. The said fork is further provided with two supporting-yokes 28 and 29, the yoke 28 being attached to each end of the cross-bar 26 and the yoke 29 to each end of the transverse rod 27, as shown. Each of said supporting-yokes has rigidly attached thereto at its highest point an upwardly-extending rod 28' or 29', which rods pass through and are threaded into transversely-extending bars 30, fastened to the main frame, as shown, said rods having at their upper ends operating-wheels. By this construction the digger-fork can be regulated to dig deeply or lightly or altogether removed from the ground, two adjusting-screws being necessary, for the reason that should the connecting-rod 29' be immovable the upper end of the fork-teeth being in such close proximity to the lower drive-roller would strike the same upon raising the lower end of the fork; but by raising the fork at both ends this difficulty is overcome.

Attached to the outer surface of the endless elevator-apron 16 are regularly-disposed transverse parallel bars 31, each of which is provided with a series of curved teeth 32, arranged in such order upon the bars 31 and of such thickness that as each bar and its series of teeth pass by and through the upper ends of the digger-fork the space between each fork-tooth is entirely filled as far down as the transversely-extending rod 27, as shown, thereby lifting all potatoes that may have been pushed to the upper end of the digger-fork and carrying them on and up until disposed of at the turning-point on the upper roller of the elevator.

It will here be noticed that the difference in size of the gear-wheel 12 and the gear-wheel 14 of the drive-roller will cause a rapid movement of the drive-roller and its elevator connection, thereby preventing too many potatoes from accumulating at the top of the digger-fork and the consequent heavy load that would be imposed upon each series of elevator-teeth as they passed between the fork-teeth.

As each load of potatoes reaches the turning point at the top of the elevator it is dumped into a rearwardly-slanting hopper 33, comprising upper and lower sections 34 and 35, extending across the end of the machine and supported at the top edge near the machine by means of a transverse rod 36, passing through an eye 37 in said top edge of the upper frame, said rod being fastened at each end to the auxiliary frame 20. The hopper-frame is further supported at the lower outside edge by means of a right-angular-shaped rod 38, the inner end of which is rigidly fastened to the rear cross-bar 3 of the main frame, and provided on its outer end with an upturned eye engaging a downwardly-projecting eye on the lower frame of the hopper, as shown, thus suspending the hopper and allowing the same to be rocked, which motion is imparted to it through the medium of a crank-shaft 39, supported in hangers along one side of the main frame and provided at one end with a spur gear-wheel 40, which meshes with the laterally-projecting teeth of the large gear-wheel 12, and at the other end with the crank-arm 41, having bearing in an eye 42, fastened on the bottom and to one side of the hopper-frame, thus imparting the rocking motion to said hopper when the machine moves.

The upper and lower sections 34 and 35 of the hopper 33 consist of a rectangular three-sided frame, each having a slatted or open-work bottom 43 and 44, consisting of the longitudinally-extending rods, fastened at one end to the side of the hopper and the other or rear end resting upon cross-strips 45 and 46. The bottom 43 of the upper section 34 extends some distance beyond that of the lower section, and the rods forming said bottom are about twice the distance apart as the lower rods, thus allowing the smaller potatoes to drop through into the lower hopper-section and be discharged in a suitable receptacle, while the larger potatoes are carried beyond and dropped in another receptacle, neither of which is shown. Any dirt remaining with the potatoes is screened off by means of the rocking motion of the hoppers.

Mounted in the forward portion of the machine to the rear of the front truck is a reciprocating cutter-bar 47, of any approved construction, supported and regulated by means of a screw-threaded rod 48, working through a cross-bar 49, and having an operating-wheel at the upper end in a similar manner to the digger-fork adjusting-rods, the object of said cutter-bar being to cut and clear away the vines. The reciprocating motion is imparted to the cutter-bar through a shaft 50, mounted in hangers along the side of the main frame opposite the side having the shaft 39, one end of said shaft 50 having connected thereto a pinion 51, meshing with the laterally-extending teeth of the gear-wheel 13, and the other end having a crank-wheel 52, having the pin 53, to which is connected the link 54, the other end of said link being connected with the cutter-bar.

The front truck is attached to the main frame of the machine by chains 55, connected to each leg of the truck-yoke and to the parallel sides of the main frame, a tongue 56 being attached to the truck, by means of which the machine is drawn along.

Having throughout the specification alluded to the operation of the machine, a further description thereof is not deemed necessary.

Upright parallel side boards 57 57 are fastened on each side of the endless carrier to the auxiliary frame, thus preventing any tendency of the potatoes to roll out at the side of the elevator.

Minor changes may be made in the arrangement and construction of my machine without departing from the spirit and intentions of my invention, and to such changes I wish to reserve exclusive right.

Having thus described my invention, what I claim as new, and desire to secure by Letters Patent of the United States, is—

1. In a potato-digger, the combination with the main frame, a rake or digger-bars supported at the forward end of said frame, a yoke to which the rake is pivoted, an adjusting-screw secured to said yoke, a second yoke in advance of the first yoke, a screw for vertically adjusting the second yoke, an endless toothed elevator coacting with said digger-bars or rake to elevate the potatoes therefrom, and a separator or hopper located at the rear end of the machine for receiving and assorting the potatoes, substantially as and for the purpose specified.

2. In a potato-digger, the combination with the main frame, a rake or digger-bars supported at the forward end of said frame, a yoke to which the rake is pivoted, an adjusting-screw secured to said yoke, a second yoke in advance of the first yoke, a screw for vertically adjusting the second yoke, an endless toothed elevator coacting with said digger-bars or rake to elevate the potatoes therefrom, and a separator or hopper located at the rear end of the machine for receiving and assorting the potatoes, and cutting mechanism located in advance of the digger-bars or rake, substantially as and for the purpose set forth.

3. In a potato-digger, the combination with the main supporting-frame, of a rake or digger-bars supported at the forward end of said frame, a yoke to which the rake is pivoted, an adjusting-screw secured to said yoke, a second yoke in advance of the first yoke, and a screw for vertically adjusting the second yoke, substantially as set forth.

In testimony whereof I have hereunto set my hand in presence of two subscribing witnesses.

EMIL PUTTKAMMER.

Witnesses:
C. M. LANKFORD,
G. WALTER MAPP.